United States Patent [19]

Flita

[11] 4,185,784
[45] Jan. 29, 1980

[54] HEAT TREATMENT APPARATUS FOR WASTE CONTAINING THERMOPLASTIC MATERIAL

[76] Inventor: Eberhard Flita, Beethovenstrasse 9,, 6521 Monsheim, Fed. Rep. of Germany

[21] Appl. No.: 921,596

[22] Filed: Jul. 3, 1978

[51] Int. Cl.² .............................................. B02C 23/00
[52] U.S. Cl. ...................................... 241/66; 241/167; 241/240
[58] Field of Search ................. 241/66, 167, 207, 254, 241/277, 239, 240, 241, 242, 221

[56] References Cited

U.S. PATENT DOCUMENTS

| | | | |
|---|---|---|---|
| 163,702 | 5/1875 | Streuley | 241/242 X |
| 1,154,004 | 9/1915 | Duffy et al. | 241/66 |
| 1,355,093 | 10/1920 | Herche | 241/167 X |
| 1,867,184 | 7/1932 | Smith | 241/167 |
| 2,156,619 | 5/1939 | Carruthers et al. | 241/241 X |
| 2,171,465 | 8/1939 | Weidlich | 241/66 |

*Primary Examiner*—Richard B. Lazarus
*Attorney, Agent, or Firm*—Woodcock, Washburn, Kurtz, Mackiewicz & Norris

[57] ABSTRACT

Apparatus is disclosed for the heat treatment of thermoplastics containing industrial and domestic refuse, as well as plastics waste. The refuse or waste is previously comminuted to a size capable of being treated in the process, then fed into the apparatus which is a crushing roller press. The press has a rotatably driven roll in a machine body, the machine body and the roll forming a converging infeed gap and two crushing gaps along the circumference of the roll. Just before a charging hopper there is a discharge opening provided with an adjustable scraper.

7 Claims, 1 Drawing Figure

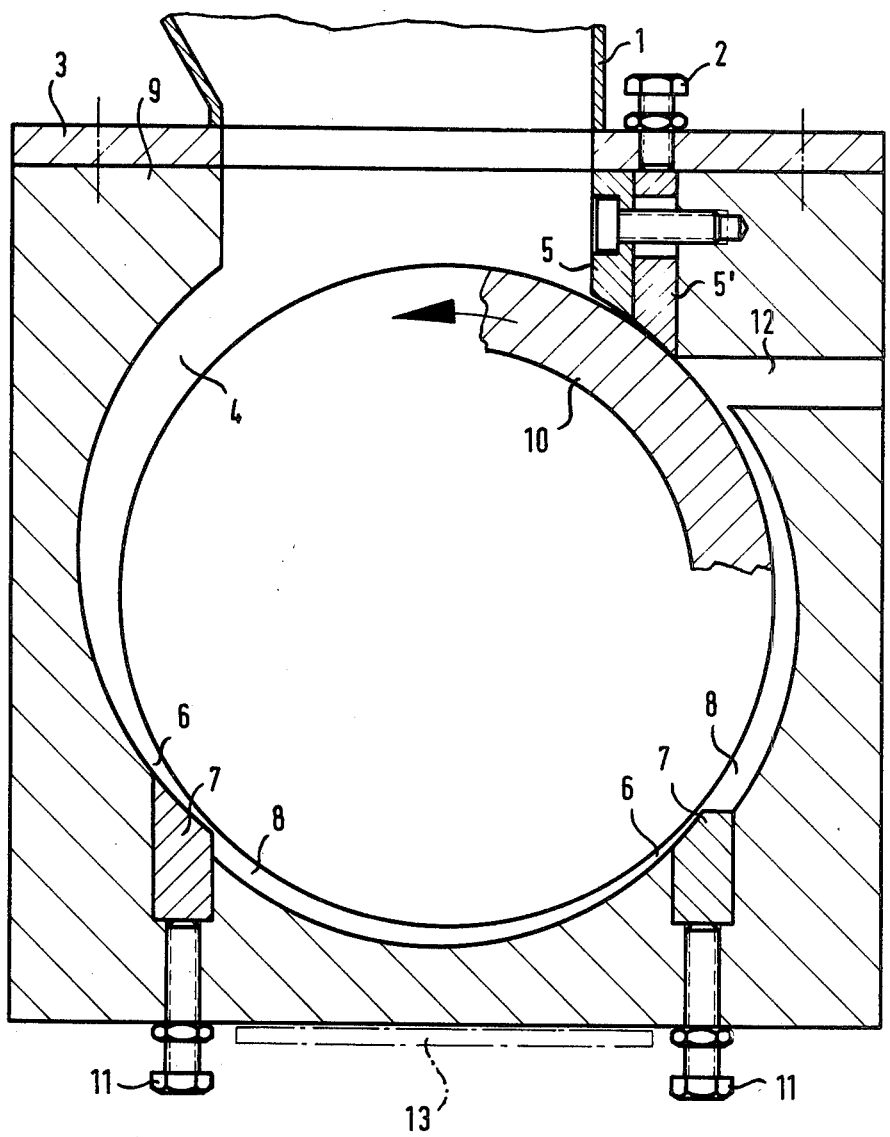

HEAT TREATMENT APPARATUS FOR WASTE CONTAINING THERMOPLASTIC MATERIAL

BACKGROUND OF THE INVENTION

1. FIELD OF THE INVENTION:

The invention concerns apparatus for the heat treatment of industrial and domestic refuse as well as plastics waste containing thermoplastics material, the waste having been previously comminuted to a processable size.

2. DESCRIPTION OF THE PRIOR ART:

Because of the ever-increasing burden on the environment the processing and re-use of waste and refuse of all kinds of material assumes ever greater significance. However, difficulties arise in the separation of the components of waste according to type. It is particularly difficult to sort from the waste those components which are of plastics and to re-use them in a convenient way.

Thus, for instance, it is known from German accepted specification No. 2,061,574 to sort paper, textile materials, glass and metal from refuse and to sort the remainder by hand into plastics as well as a part which is mainly of organic components. The plastics material is then comminuted, heat treated and finally processed into a plastics product, the plastics material not regeneratable by heat being incorporated as a filler into the plastics product.

This process ensures an expedient mode of re-utilisation of the plastics materials but on the other hand it is relatively labour-intensive. In particular, it is nowadays difficult to procure workmen to sort waste by hand.

From German published application No. 21 07 268 it is known to sort previously comminuted plastics parts according to the buoyancy principle, to granulate the sorted plastics materials and then, as far as possible, to press them into new plastics parts. Although this process leads to almost pure plastics parts as regards the type of plastics, it has nevertheless the disadvantage that the sorting involves significant investment costs.

Finally, it is already known from German published application No.21 45 310 to comminute plastics waste and to cover or encapsulate its parts with a suitable binding material, for instance a cement mixture or water glass, and to utilise the covered or encapsulated parts as filling and insulating material for finished structural products. In using this process the waste plastics can be re-utilised in a relatively simple way. It is however a precondition that the plastics waste should not contain other types of waste. The thus treated plastics material is in addition usable to a limited extent only.

SUMMARY OF THE INVENTION

The underlying task of the invention is to provide apparatus with which thermoplastics-containing industrial and domestic refuse as well as plastics waste can be pressed in the simplest possible way and with high output to economically usable shaped parts.

This task is sought to be solved according to the invention by apparatus for the heat treatment of industrial and domestic refuse as well as plastics waste containing thermoplastics material which is previously comminuted to a size capable of being treated in the process, wherein the improvement consists in that the apparatus is a crushing roller press, said press including a machine body, a rotatable roll in the machine body, the machine body and the roll defining therebetween a converging infeed gap and at least one crushing gap along the circumference of the roll, a charging inlet and a discharge outlet; and adjustable scraper means for scraping the roll between the discharge outlet and the charging inet.

With the apparatus according to the invention the thermoplastics containing industrial and domestic refuse as well as plastics waste can be treated wherein, without addition of binding material, thermosetting plastics, old tyres, minerals, metals, wood etc. may homogeneously be worked into the melt produced by pressure and frictional heat. Naturally, waste can also be processed with the addition of cold-hardening binders or multicomponent binders. In the crushing gap(s) of the machine according to the invention a very high pressure can build up so that the materials prepared for pressing are optimally dissociated under the effect of the very high pressure and are cross-linked with thermoplastic or other binders. Behind the crushing gap(s) good homogenisation of the mass is achieved which mass is further processed thereafter into pressed or shaped bodies.

When processing materials which had blowing agents mixed with them or which are moist, the vapours are separated via the material inlet. Because of the high pressure build-up at the material discharge air inclusions in the processed material are avoided.

BRIEF DESCRIPTION OF THE DRAWING

The drawing shows a schematic cross-section of a preferred embodiment of apparatus for the heat-treatment of thermoplastics-containing industrial and household refuse as well as plastics waste.

DESCRIPTION OF THE PREFERRED EMBODIMENT

The apparatus consists essentially of a machine body 9 provided with a generally cylindrical, horizontally extending opening and a roll 10 mounted in the opening. The axis of roll 10 is displaced slightly from the approximate center of the opening defined by body 9. Conventional motor drive means, not shown, are utilized to rotate roll 10. The machine body 9 is covered by a cover plate 3 in which a charging opening or inlet is provided. The charging opening in the cover plate 3 is joined at its bottom to an aligned charging opening in the machine body 9 and at its top to a charging hopper 1.

Following the charging inlet in the direction of rotation of the roll 10 indicated by an arrow is a nip or draw-in gap 4 which tapers to a crusher gap 6. A crusher block 7 adjustable in a vertical direction by means of an adjusting screw 11 is mounted at the crusher gap 6. By adjustment of the adjustment screw 11 the crushing gap can be matched to the type of material to be processed. A space 8 follows the first crushing gap 6, in the direction of rotation. Then in the direction of rotation there follows a further crushing gap with a crusher block 7 and a further space 8. Behind the space 8 there is a discharge gap 12. An adjustable scraper 5' and a fixed scraper 5 are disposed between the discharge gap 12 and the charging opening. The adjustable scraper 5' can be adjusted towards the roll either with the aid of an adjusting screw or automatically in accordance with the viscosity of the material, so that the scraping gap is adjustable.

The material to be processed arrives from a comminuting device arranged directly before the apparatus according to the invention into the charging hopper 1, the heat generated in the course of comminution being utilised to evaporate the water and other liquids and also used to melt the thermoplastic plastics materials in the apparatus. After the charging hopper 1 the material reaches the nip or draw-in gap 4 and the crusher gap 6 where the thermoplastic synthetic materials are melted under pressure and optionally by additional heating, with the vapours arising from the very high pressure being discharged upwardly through the charging hopper 1. Behind the narrowest part of the crushing gap 6 at the crusher block 7 the material passes into the space 8 where it is relaxed or stress-relieved and homogenised. This process is repeated at the second crushing gap 6, the crusher block 7 and space 8 which follow in the direction of rotation of the roll 10. After the space 8 the material passes over a tapered portion to the discharge gap 12 where any air inclusions still present in the material to be processed are removed and where the material is passed out for further processing. The roll 10 can be scraped to a selectable layer thickness by means of the scrapers 5 and 5' behind the discharge gap 12.

The molten plastics layer remaining on the roll after the scrapers 5, 5' promotes the drawing-in of the material arriving through the charging hopper 1 into the draw-in nip 4.

Should it be necessary, the machine body 9 may be heated by a heater 13, illustrated by broken lines, to promote the softening of the thermoplastic material. The roll 10 may be heatable and/or coolable.

What is claimed is:

1. Apparatus for treatment of industrial and domestic refuse, said apparatus comprising:
   a. a machine body having an opening of predetermined geometry for receiving a roll;
   b. a generally cylindrical roll mounted in said body opening, with means for rotating said roll, said roll and said opening geometry defining a plurality of adjacent converging gaps therebetween;
   c. said body containing a charging inlet for introducing said refuse, said charging inlet being positioned at the start of a first of said converging gaps, and further containing a discharge outlet at about the end of another of said gaps, for discharging treated refuse;
   d. scraper means positioned in operative registration with said discharge outlet for scraping treated refuse from said roll; and
   e. a crusher block mounted at the end of each of a plurality of said gaps, said geometry being a continuous curve for the length of each of said gaps and discontinuous at the point where each crusher block defines the end of one gap and the start of an adjacent gap.

2. Apparatus according to claim 1, wherein each said crusher block is adjustable relative to said roll to define a crushing gap.

3. Apparatus according to claim 1 wherein the scraper means is automatically adjustable.

4. Apparatus according to claim 1 wherein heating means are provided for heating the machine body.

5. Apparatus according to claim 1 wherein heating means are provided for the roll.

6. Apparatus according to claim 1 or claim 5 wherein cooling means are provided for the roll.

7. The apparatus as described in claim 1, wherein said scraper means comprises a fixed scaper and an adjustable scraper.

* * * * *